United States Patent [19]

Tanaka

[11] 4,160,265
[45] Jul. 3, 1979

[54] VERTICAL APERTURE CORRECTION CIRCUIT

[75] Inventor: Sadaaki Tanaka, Atsugi, Japan

[73] Assignee: Sony Corporation, Tokyo, Japan

[21] Appl. No.: 897,426

[22] Filed: Apr. 18, 1978

[30] Foreign Application Priority Data

Apr. 25, 1977 [JP] Japan .................................. 52-46784

[51] Int. Cl.² ............................................. H04N 5/14
[52] U.S. Cl. ....................................... 358/37; 358/162
[58] Field of Search ............................. 358/37, 162, 96

[56] References Cited

U.S. PATENT DOCUMENTS 3,946,152  3/1976  Illetschko et al. ................... 358/162
4,086,618  4/1978  Koubek .................................. 358/96

Primary Examiner—Richard Murray
Attorney, Agent, or Firm—Lewis H. Eslinger; Alvin Sinderbrand

[57] ABSTRACT

A video signal processing circuit, particularly for use in conjunction with a single-tube indexing color television camera, provides an output video signal to which a vertical aperture correction has been added, and which cancels undesired line-to-line amplitude changes, thereby preventing line-crawling distortion. The video signal processing circuit includes an input circuit to which an input video signal is supplied, a delay circuit for delaying the input video signal from the input circuit by one horizontal scanning interval, a signal squaring circuit for squaring the difference in level between the input video signal and the delayed input video signal, and a mixing circuit for combining the input video signal with the squared signal output from the squaring circuit. The squaring circuit can include a multiplier circuit, or a square-law characteristic FET, to which the difference in level between the delayed and undelayed input video signals is applied. Alternatively, the squaring circuit may include a multiplier FET to which the delayed and undelayed input video signals can be directly applied.

16 Claims, 9 Drawing Figures

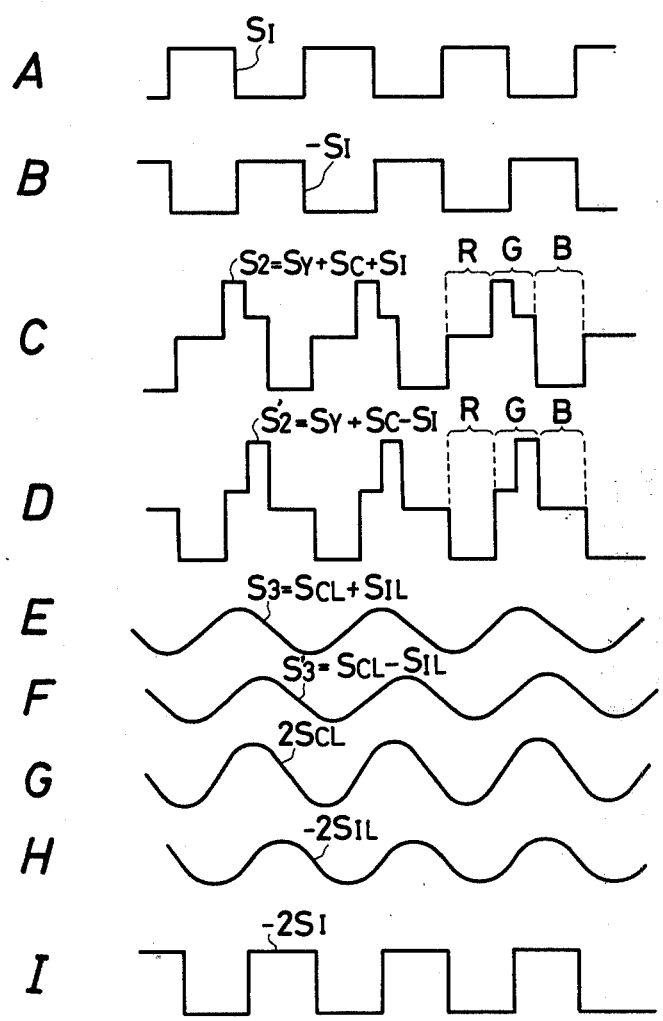

VERTICAL APERTURE CORRECTION CIRCUIT

BACKGROUND OF THE INVENTION

1. Field of the Invention

The present invention relates generally to vertical aperature correction of video signals, and more particularly is directed to a circuit for applying a vertical aperture correction to the luminance signal in a color television camera system.

2. Description of the Prior Art

Color television cameras of the photo-conductive type, such as vidicon, single-tube color television cameras, do not exhibit the picture sharpness which is characteristic of "image orthicon" black and white TV cameras. The vidicon, single-tube color television cameras lack the "edge sensitivity" characteristic of the image orthicon cameras, both because of leakage at the target electrode of the vidicon, and because of the finite size of the scanning electron beam. In a color television camera, the loss of sharpness is compounded because it is necessary to utilize a comparatively narrow contrast range in order to get a good color signal.

Arrangements have been suggested, for instance in U.S. Pat. No. 2,957,042 (Gibson et al.), for compensating for the loss of sharpness in the direction perpendicular to the direction of line scanning. Since the above described loss of detail is analogous to aperture aberration in a photo optical system, and because the direction perpendicular to line scanning is usually vertical, such an arrangement is frequently termed "a vertical aperture compensation system."

Typically, the prior art vertical aperture compensation system delays the luminance signal for a time period corresponding to one line or horizontal scanning interval, and then combines the delayed luminance signal with the undelayed luminance signal. In this way, there is provided a vertical aperture correction signal which emphasizes the difference in luminance from line to line. The vertical aperture correction signal for each line scanning interval is then combined with a respective horizontal line interval of the luminance signal. The resulting combined signal accentuates changes in contrast from line to line, thereby providing a sharper video picture.

Nevertheless, the luminance signal of a color video signal produced by a color television camera, even with a vertical aperture correction circuit, can include undesirable level changes from one horizontal line scanning interval to another. Such changes in luminance level may originate in a color television camera of the index type, or may arise from other causes. In a typical color television camera of the index type, such as that described in U.S. Pat. No. 3,784,737, having a common assignee herewith, a predetermined alternating potential or bias distribution is established on the photoelectric conversion layer for providing an alternating index signal superposed on the video output for use in separating individual color signals from the chrominance component. However, this alternating potential or bias causes the luminance signal in consecutive line scanning intervals within each field to take on levels that vary from one line scanning interval to the next. Such change in level from line to line results in a "line crawling" effect in the luminance signal.

Prior art vertical aperture correction circuits do not provide a vertical aperture correction signal which is free from the line crawling effect. In fact, prior art vertical aperture correction circuits often combine the luminance information in consecutive horizontal scanning intervals in such a way as to add together the undesirable level changes, thereby accentuating the line crawling effect, while attempting to enhance the vertical detail in the television picture.

OBJECTS AND SUMMARY OF THE INVENTION

Accordingly, it is an object of the present invention to provide a vertical aperture correction circuit for a color television camera which is free of the above mentioned defects of the prior art.

More specifically, it is an object of the present invention to provide a vertical aperture correction circuit which enhances the vertical detail of the luminance signal in a picture provided by a color television camera, and which cancels or eliminates "line crawling" caused by undesirable level changes in the video signal from one horizontal scanning interval to the next.

In accordance with an aspect of this invention, a video signal processing circuit for producing a vertical aperture correction signal free of "line crawling" includes a delay for delaying an input video signal by a period of one horizontal scanning interval, a signal squaring circuit for squaring the difference in level between the delayed and undelayed input video signals, and a mixing circuit for mixing the input video signal with the squared signal.

In a particular embodiment of the invention, the squaring circuit can include a multiplier circuit having two input terminals to each of which the difference between the delayed and undelayed video signals is simultaneously applied. Alternatively, the squaring circuit can include a multiplier IC with four input terminals to which the delayed and undelayed video signals are directly applied so that the IC acts as a subtractor for providing the difference between the delayed and undelayed video signals, and also as a squaring circuit in respect to such difference.

The above, and other objects, features and advantages of the invention, will be apparent in the following detailed description of illustrative embodiments thereof which is to be read in conjunction with the accompanying drawings.

BRIEF DESCRIPTION OF THE DRAWINGS

FIGS. 3 and 4 are waveform diagrams to which reference will be made in explaining the operation of the color television camera of FIG. 1;

FIGS. 7–7G are waveform diagrams to which reference will be made in explaining the operation of the signal processing circuit of FIG. 6;

DETAILED DESCRIPTION OF THE PREFERRED EMBODIMENTS

Figure 2:
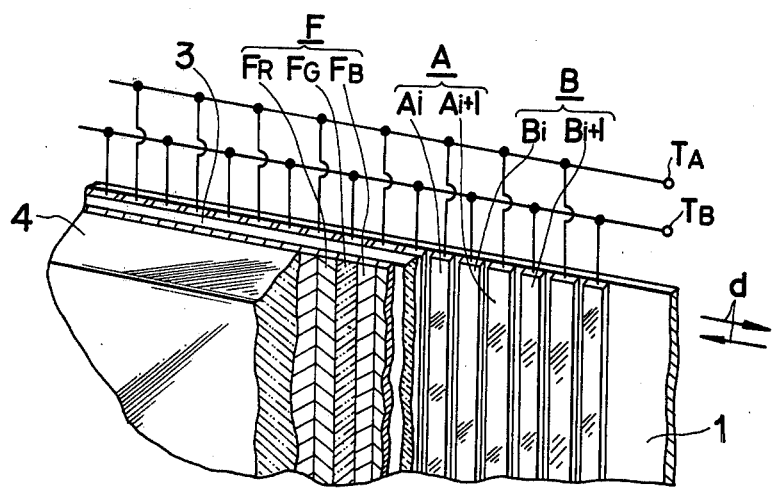
FIG. 2 is a perspective view showing a fragment of a target which constitutes a principal part of an image pick-up tube employed in the color television camera of FIG. 1.

A description will be given first of an image pickup tube 2 of a type to which the present invention is advantageously applied. The target end of the tube 2 is shown on FIG. 2 to comprise a plurality of sets of nesa electrode elements $A_1, B_1, \ldots A_n, B_n$, having a predetermined width of, for example, 5 microns interleaved in a repeating cyclic order at predetermined intervals of, for example, 30 microns of a photoelectric conversion layer 1, such as a photoconductive layer of antimony trisulfide, which is scanned by an electron beam. The electrode elements $A_1, \ldots A_n$ and $B_1, \ldots B_n$ are interconnected to form electrodes A and B, respectively, connected to signal output terminals $T_A$ and $T_B$. Electrodes A and B are arranged so that their longitudinal directions are different from the electron beam horizontal scanning direction, which is indicated by arrows d. In the example shown, the electron beam horizontal scanning direction d and the longitudinal directions of the electrodes A and B are perpendicular to each other. The electrodes A and B are formed on a transparent, protective, insulating plate 3, for example, of glass, and photoelectric conversion layer 1 is formed over the electrodes. On the other side of glass plate 3 is disposed an optical filter F which consists of red, green, and blue optical strip filter elements $F_R$, $F_G$, and $F_B$ of a predetermined width which are sequentially arranged at predetermined intervals in a repeating cyclic order $F_R$, $F_G$, $F_B$, $F_R$, $F_G$, $F_B$, ... so that each triad of red, green, and blue otical strip filter elements will be opposite a respective pair of adjacent electrode elements $A_i$ and $B_i$ of the aforementioned electrodes A and B. The arrangement is such that the longitudinal directions of the strip filter elements agree with those of the electrodes A and B. A faceplate glass 4 covers the optical filter F.

Figure 1:
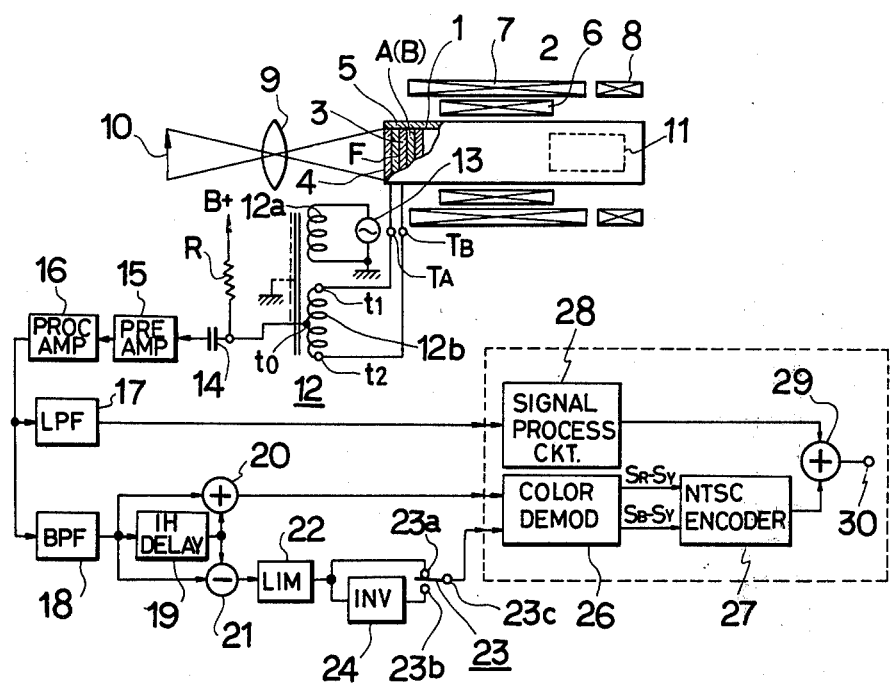
FIG. 1 is a diagrammatic view showing one example of a color television camera to which the present invention is applied.

The photoelectric conversion layer 1, the electrodes A and B, the glass plate 3, the optical filter F and the faceplate glass 4 are combined in a disc-like configuration which may, for example, have a diameter of 2.54 cm., and which is attached to one end of a pickup tube envelope 5, as shown on FIG. 1. The tube envelope 5 has a deflection coil 6, a focusing coil 7, and an alignment coil 8 mounted thereon. Reference numeral 9 indicates a camera lens by means of which rays of light from an object 10 to be televised enter the tube envelope 5 through the faceplate 4 and are focused on the photoelectric conversion layer 1. Reference numeral 11 designates an electron gun within envelope 5 for directing an electron beam against photoelectric conversion layer 1.

During operation of the image pickup tube, an alternating signal $S_1$ (FIG. 3) is supplied to electrodes A and B, for example, by way of a transformer 12 having the ends $t_1$ and $t_2$ of its secondary winding 12b connected to the signal output terminals $T_A$ and $T_B$, respectively. A signal source 13 is provided for generating the alternating signal $S_1$ which is synchronized with the horizontal scanning period of an electron beam on photoelectric conversion layer 1, and the signal source 13 is connected to a primary winding 12a of transformer 12. The alternating signal $S_1$ is a rectangular wave which has a pulse width 1H equal to the electron beam horizontal scanning period H. For the NTSC system, this is a pulse width of 63.5 μsec. The signal $S_1$ has a repetition rate of one half of the horizontal scanning frequency, which repetition rate is 15.75/2 KHz for the NTSC system. Such an alternating signal $S_1$ may be produced by making use of a pulse signal derived from the DC-DC converter of a high voltage generator circuit, for example. Such DC-DC converters are well known and need not be described here. The center tap $t_O$ of the secondary winding 12b of transformer 12 is connected to the input side of a preamplifier 15 through a capacitor 14, and a DC power source B+, for example, of 10 to 50 V, is connected to the center tap $t_O$ of the secondary winding 12b through a resistor R.

Instead of providing the described transformer 12, it is possible to connect resistors in series between the terminals $T_A$ and $T_B$, with the connection point between such resistors being connected to the input terminal of the preamplifier 15 through a capacitor and with the afore-mentioned rectangular wave $S_1$ being supplied to the electrodes A and B through capacitors.

Figure 3:
Figure 5:
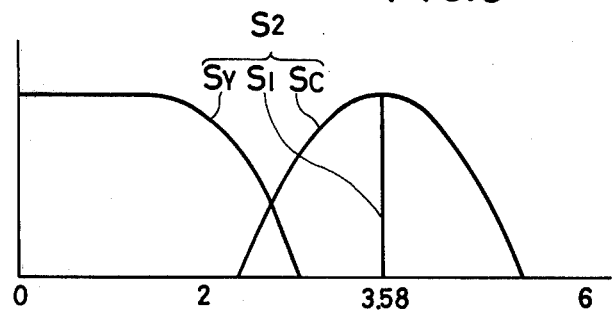
FIG. 5 is a graphic illustration of a frequency spectrum of a composite color signal obtained with the color television camera of FIG. 1.

With the arrangement shown on FIG. 1, in a certain horizontal scanning period $H_i$, the electrode A is supplied with a superimposed voltage consisting of the voltage derived from the DC power source B+ and the signal $S_1$ shown on FIG. 3. In the same period $H_i$, electrode B is supplied with only the voltage from DC power source B+, so that the potential of electrode A exceeds that of electrode B, thus forming a striped charge image on photoelectric conversion layer 1 corresponding to the electrode A. When no light from the object 10 is incident on the image pickup tube 2 during the horizontal scanning period $H_i$, a rectangular wave signal $S_i$, such as is shown in FIG. 4A, is derived at the input side of the preamplifier 15. This signal $S_1$ serves as an index signal, the frequency of which is determined by the widths and spacings of the electrodes A and B and by the time required for one horizontal scanning period of the electron beam. For example, the frequency of the index signal $S_1$ may be selected to be 3.58 MHz. When rays of light from object 10 are focused on photoelectric conversion layer 1, a signal corresponding to the color-separated image on the photoelectric conversion layer 1 is superimposed on the index signal $S_1$ to provide a composite signal $S_2$, such as is depicted on FIG. 4C. In FIG. 4, those portions of the composite signal $S_2$ which correspond to the red, green, and blue colored light are indicated at R, G, and B, respectively. The composite signal $S_2$ is expressed by the sum of a luminance signal $S_Y$, a carrier color, or chrominance, signal $S_C$ and the index signal $S_1$, namely $S_2 = S_Y + S_C + S_1$. The frequency spectrum of the composite signal $S_2$ (FIG. 5) is determined by the widths and spacings of electrodes A and B and strip by filter elements $F_R$, $F_G$, and $F_B$ of the optical filter F and by the horizontal scanning period. As shown, for the example given above, the composite signal $S_2$ is positioned within the band of 0 to 6 MHz. The luminance signal $S_Y$ occupies the lower frequency portion of this band, and the chrominance signal $S_C$ occupies the higher frequency portion of the band. It is preferred to minimize the overlapping of the luminance signal $S_Y$ and the chrominance signal $S_C$ and, if necessary, resolution can be lowered a little by placing a lenticular lens in front of the image pickup tube 2 to narrow the band width of luminance signal $S_Y$.

Due to the alternating character of signal $S_1$, in the next or subsequent horizontal scanning period $H_{i+1}$, the voltages applied to electrodes A and B are reversed. Accordingly, a resulting index signal $-S_1$ (FIG. 4B) is produced. This index signal $-S_1$ is opposite in phase to the index signal $S_1$ depicted on FIG. 4A. As a result of the phase reversal of the index signal, the composite signal then derived at the input side of preamplifier 15 is $S_2' = S_Y + S_C - S_1$, as shown on FIG. 4D.

Such a composite signal $S_2$ (or $S_2'$) is supplied to the preamplifier 15 to be amplified and is then fed to a processing amplifier 16 to be subjected to waveshaping and gamma correcting. Thereafter, the composite signal is applied to a low-pass filter 17 and to a band-pass filter (or a high-pass filter) 18 for obtaining the luminance signal $S_Y$ from low-pass filter 17 and a signal $S_3 = S_{CL} + S_{1L}$, such as is shown on FIG. 4E (or $S_3' = S_{CL} - S_{1L}$, such as is shown on FIG. 4F) from band-pass filter 18. The symbols $S_{CL}$ and $S_{1L}$ represent low-frequency components (fundamental wave components) of the chrominance signal $S_C$ and the index signal $S_1$, respectively.

Since index signal $S_1$ and chrominance signal $S_C$ have the same frequency, they cannot be separated by a filter, but signals $S_1$ and $S_C$ can be separated in the following manner. The output of filter 18 is connected to a delay circuit 19 (FIG. 1), for example, made up of a crystal, and which delays by one horizontal scanning period 1H the signal $S_3 = S_{CL} + S_{1L}$ (or $S_3' = S_{CL} - S_{1L}$). The signal $S_3 = S_{CL} + S_{1L}$ (or $S_3' = S_{CL} - S_{1L}$) derived from the delay circuit 19 and which corresponds to the horizontal scanning period $H_i$, and the signal $S_3' = S_{CL} - S_{1L}$ (or $S_3 = S_{CL} + S_{1L}$) derived from the band-pass filter 18 in the subsequent horizontal scanning period $H_{i+1}$ are added together in an adder circuit 20. In this case, the chrominance signal $S_C$ in adjacent horizontal scanning periods can be regarded as substantially the same, so that a carrier color signal $2S_{CL}$, such as is shown on FIG. 4G, is provided as the sum of the signals $S_3$ and $S_3'$.

Further, the signals from the filter 18 and the delay circuit 19 are supplied to a subtracting circuit 21. During one horizontal scanning interval, the output of the subtracting circuit is $S_3 - S_3'$, or $(S_{CL} + S_{1L}) - (S_{CL} - S_{1L}) = 2S_{1L}$. During the next scanning interval the output of the subtracting circuit is $S_3' - S_3$, or $(S_{CL} - S_{1L}) - (S_{CL} + S_{1L}) = -2S_{1L}$, as shown on FIG. 4H. Such an index signal $-2S_{1L}$ (or $2S_{1L}$) is fed to a limiter amplifier 22 (FIG. 1) to limit its amplitude to a constant value, thus providing an index signal $-2S_1$, such as is depicted on FIG. 4I (or an index signal $2S_1$, not shown).

The output of the limiter 22 is connected to one fixed terminal 23a of a change-over switch 23 which is desirably an electronic switch in practice. The switch 23 has another fixed contact 23b and a movable contact 23c, and the output of limiter amplifier 22 is also connected through an inverter 24 to fixed contact 23b. The movable contact 23c is suitably actuated to engage fixed contacts 23a and 23b alternately and to be switched from one to the other at the end of every horizontal scanning line in synchronism with the alternating signal $S_1$ impressed across the primary winding of the transformer 12. As a result, the index signal $S_1$ is obtained from movable contact 23c at all times.

The movable contact 23c is connected to a color demodulator 26 to supply index signal $2S_1$ thereto. The demodulator 26 is also supplied with the chrominance signal $S_C$ from adder circuit 20. The color demodulator circuit 26 includes a synchronous detector circuit which produces color difference signals $S_R - S_Y$ and $S_B - S_Y$ by sampling the carrier color signal $S_C$ with a signal produced by predetermined shifting of the phase of the index signal $S_1$. The color difference signals $S_R - S_Y$ and $S_B - S_Y$ thus obtained are fed to an NTSC color encoder 27 which produces a chrominance signal of the NTSC color standard. Of course, in suitable cases, the NTSC color encoder 27 may be replaced by either a PAL encoder or SECAM encoder. The NTSC encoded chrominance signal from encoder 27 and the luminance signal $S_Y$ from filter 17 are combined, for example, in a mixer circuit 29, to provide a composite NTSC color television signal at output terminal 30.

Figure 7:
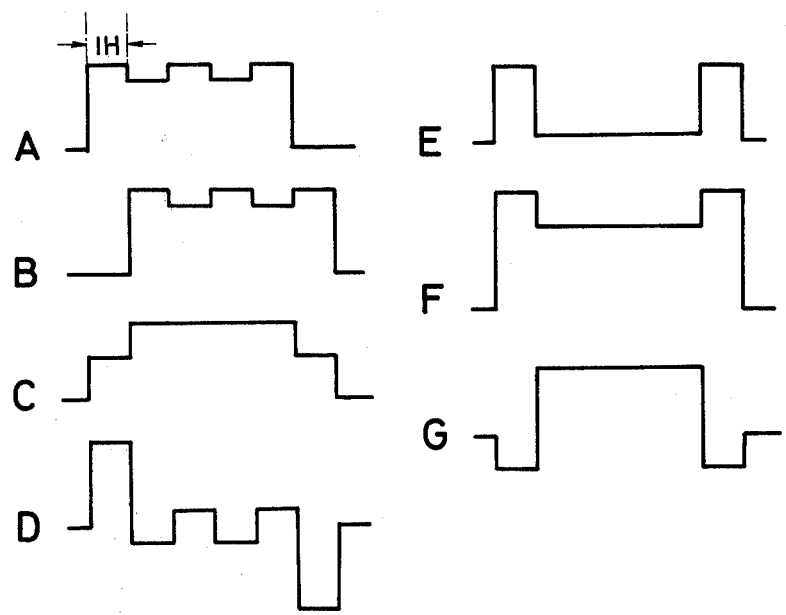

However, as previously mentioned, due to the alternating potentials applied to electrodes A and B of camera tube 2 for providing the index signals $S_1$ and $-S_1$ in alternating horizontal or line intervals, the luminance signal $S_Y$ obtained from filter 17 will include undesirable level changes referred to as "line crawling," for example, as shown in FIG. 7A. Therefore, in accordance with this invention, the luminance signal $S_Y$ from filter 17 is applied to a video signal processing circuit 28 which adds a vertical correction component or signal to the luminance signal for eliminating the "line crawling" distortion from the latter before the corrected luminance signal is applied to mixer circuit 29.

Figure 6:
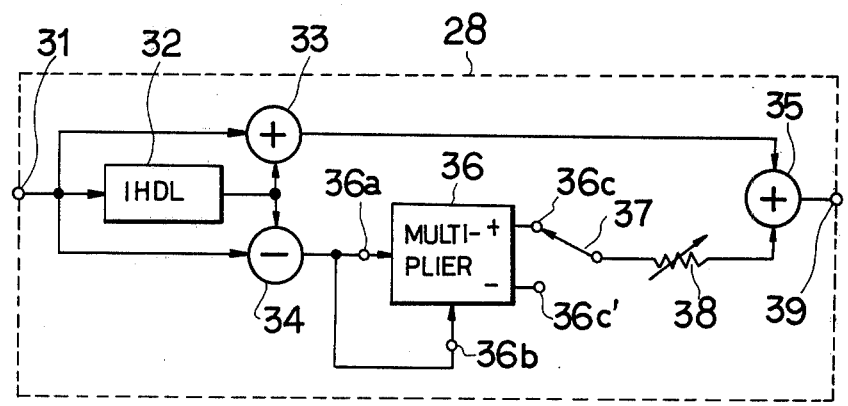
FIG. 6 is a block diagrammatic view of a signal processing circuit according to one embodiment of the present invention.

The general arrangement of the signal processing circuit 28 according to this invention is shown on FIG. 6 where an input terminal 31 receives the luminance signal $S_Y$ from low-pass filter 17, and supplies the luminance signal to a delay circuit 32 for delaying the luminance signal $S_Y$ for a period of time equal to one horizontal scanning interval (1H). Input terminal 31 also supplies luminance signal $S_Y$ to a first adding circuit 33 and to a subtracting circuit 34. The luminance signal delayed by one horizontal scanning interval (1H) is supplied from delay circuit 32 to first adding circuit 33 and to subtracting circuit 34. The combined or added signal from the output of first adding circuit 33 is supplied to a second adding circuit 35. The difference signal from subtracting circuit 34 is applied to two inputs 36a and 36b of a multiplier 36 which acts as a squaring circuit for the difference signal. A switch 37 selectively connects one or the other of two outputs 36c and 36c' of multiplier 36 to adding circuit 35 through a variable resistance 38. The outputs 36c and 36c' of multiplier 36 respectively provide the squared signal with positive and negative polarities, respectively.

The operation of the processing circuit 28 can be explained in terms of waveform functions. As illustrated by FIG. 7A, in each field of the video signals, the incoming luminance signal $S_Y$ from filter 17 includes line-by-line level changes. The waveform of the luminance signal $S_Y$ can be represented as a waveform function $f(t)$.

As illustrated in FIG. 7B, the luminance signal $S_Y$, delayed for a time equal to one horizontal line scanning interval, also includes line-by-line level changes. The waveform of the delayed luminance signal can be represented by a waveform function $f'(t)$.

The combined or added incoming luminance and delayed luminance signals, can be represented by a waveform function $f_A(t)$ expressed by the following equation:

$$f_A(t) = a[f(t) + f'(t)] \tag{1}$$

in which a is an arbitrary constant.

As will be seen in FIG. 7C, in which the constant a is ½, in the signal represented by waveform function $f_A(t)$, the line crawling components (i.e., line-by-line level changes) in the delayed and undelayed luminance signals offset each other and are eliminated. Accordingly, waveform function $f_A(t)$ is free from any line-crawling component.

As illustrated in FIG. 7D, a difference signal obtained by subtractively combining the delayed and undelayed luminance signals has a positive-going portion whose pulse width corresponds to one horizontal line scanning interval (1H) at the beginning of the luminance signal $S_Y$, and also has a negative-going portion whose pulse width corresponds to one horizontal line scanning interval (1H) at the end of the luminance signal $S_Y$. Furthermore, the waveform of the difference signal of FIG. 7D exhibits line-crawling components of constant amplitude which alternate between negative and positive polarities for successive horizontal line scanning intervals (1H), and which are interposed between the positive-going and negative-going portions at the beginning and end of signal $S_Y$.

When the difference signal (FIG. 7D) is squared (or multiplied by itself) and the resulting squared signal has its level adjusted, there is provided the signal of FIG. 7E which can be represented by a waveform function $f_R(t)$ expressed as follows:

$$f_R(t) = \pm b[f(t) - f'(t)]^2 \qquad (2)$$

where b is a constant.

The effect of squaring the difference signal of FIG. 7D is to square the amplitudes of the positive- and negative-portions at the beginning and end and of the alternately negative and positive line-crawling components therebetween, and also to provide all of the squared portions of the signal with the same polarity. It will be seen that the squaring of the alternating negative and positive line-crawling components in the signal of FIG. 7D eliminates any corresponding level changes in the squared signal of FIG. 7E.

The signal $f_R(t)$ of FIG. 7E can be employed as a vertical aperature correction signal for the combined luminance signal $f_A(t)$ of FIG. 7C to provide a combined luminance signal with vertical aperture correction represented by a waveform function F(t) which is expressed as follows:

$$F(t) = f_A(t) \pm f_R(t) = a[f(t) + f'(t)] \pm b[f(t) - f'(t)]^2 \qquad (3)$$

Thus, the luminance signal obtained at the output of signal processing circuit 28 is represented by waveform function F(t) which, as indicated in equation (3), is in turn dependent on the incoming luminance signal $S_Y$ represented by waveform function f(t) and on the delayed luminance signal represented by the waveform function f'(t).

In applying the above general theory of operation of signal processing circuit 28 to the arrangement of the latter shown on FIG. 6, it will be seen that first adding circuit 33, in combining the input luminance signal $S_Y$ with the delayed luminance signal from the output of delay circuit 32, provides at its output the signal illustrated on FIG. 7C and represented by waveform function $f_A(t)$ of equation (1). The subtracting circuit 34 in subtractively combining the input luminance signal $S_Y$ and the delayed luminance signal from the output of delay circuit 32, provides at its output the signal illustrated on FIG. 7D. The latter signal is applied to inputs 36a and 36b of multiplier 36, so that at output 36c thereof, multiplier 36 will provide a product signal, which is the produce of the level of the output of subtracting circuit 34 times itself, as illustrated in FIG. 7E, and which can be represented by waveform function $f_R(t)$ of equation (2). Thus, multiplier 36 acts as a squaring circuit, and the output of multiplier 36 provides a vertical aperature correction signal which is of positive polarity when derived from output 36c and of negative polarity when derived from output 36c'. Variable resistance 38 can be adjusted to select the appropriate amplitude for the vertical aperture correction signal. It should be noted that adjusting the variable resistor 38 corresponds to the selecting of constant b of equation (2). The second adding circuit 35 combines the combined luminance signal from adding circuit 33 with the vertical aperature correction signal, thus providing an output luminance signal with vertical aperture correction, as illustrated in FIG. 7F, and which corresponds to waveform function F(t) of equation (3). The resulting signal is supplied from output 39 to combining the circuit 29 (FIG. 1) for combining the corrected luminance signal with the NTSC encoded chrominance signal.

On FIG. 6, switch 37 is shown connected to the output terminal 36c of multiplier 36, so that output terminal 39 provides a luminance signal to which a positive-going vertical aperture correction has been added. In this case, where a positive vertical aperture correction signal is used, overshoots each corresponding to one horizontal scanning interval (1H) are provided at the beginning and end, respectively, of the output luminance signal, as illustrated on FIG. 7F.

Conversely, if switch 37 is connected to the negative polarity output 36c' of multiplier 36 to provide a negative vertical aperture correction signal, then undershoots corresponding to one horizontal scanning interval (1H) are provided at the beginning and end, respectively, of the output luminance signal, as illustrated on FIG. 7G. In that case, the output terminal 39 provides a luminance signal to which a negative-going vertical aperture correction has been added.

In summary, the output signal at output terminal 39 is composed of an output luminance signal to which a positive-going or negative-going vertical aperture correction has been added in a manner that eliminates any line crawling component from the output luminance signal.

The extent of such vertical correction can be selected by adjusting the resistance of variable resistor 38.

Figure 8:
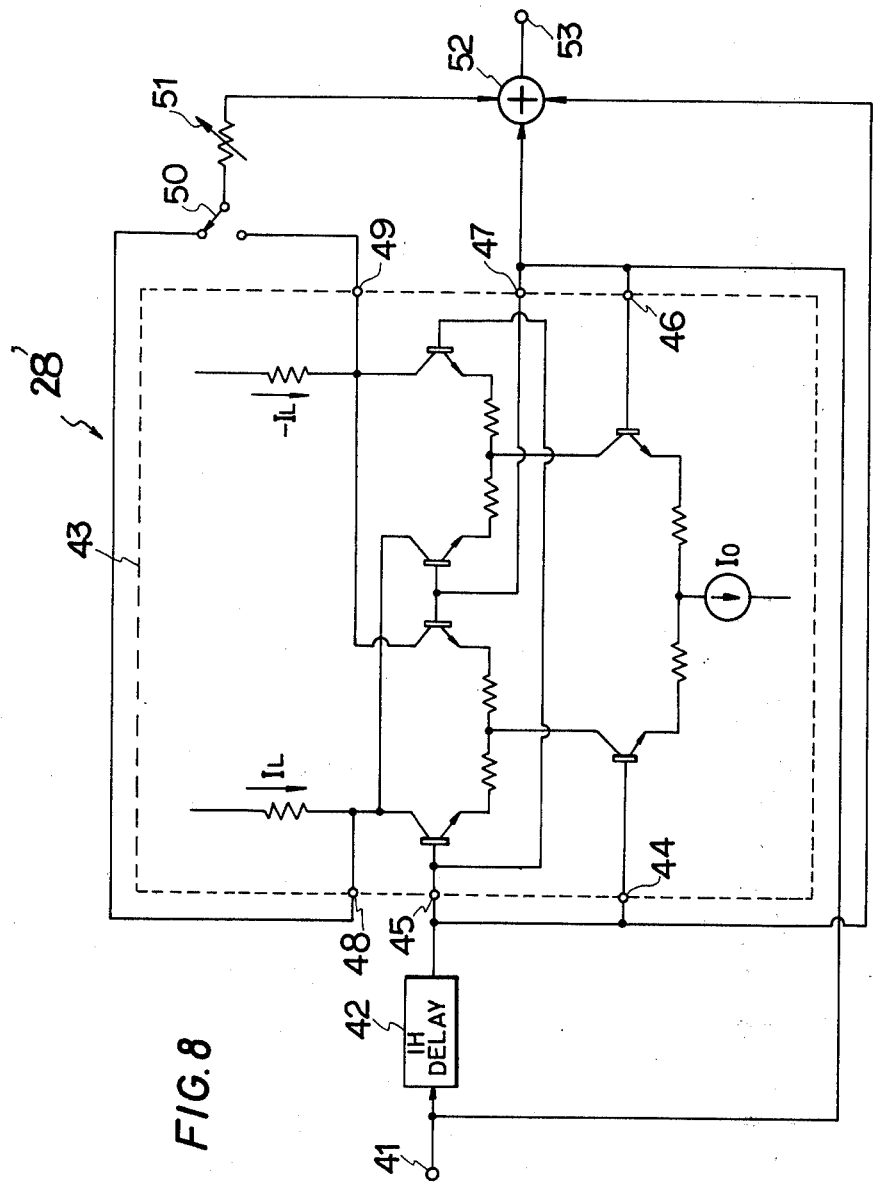
FIG. 8 is a schematic circuit diagram showing another embodiment of the present invention which employs a multiplier IC as a squaring circuit therein.

Although the signal processing circuit 28 according to this embodiment has been shown to include first and second adding circuits 33 and 35, subtracting circuit 34 and multiplying circuit 36, it is apparent that alternative arrangements can be employed to provide a mixed signal represented by a waveform F(t) of equation (3). Thus, for example, as illustrated on FIG. 8, in a signal processing circuit 28' according to this invention, an integrated circuit (IC) 43 can replace both the multiplier 36 and the subtracting circuit 34 of FIG. 6. In the circuit 28' of FIG. 8, a luminance signal $S_Y$ is applied from an input terminal 41 to a delay line 42 for delaying the luminance signal by one horizontal line scanning interval. The undelayed luminance signal $S_Y$ is also applied to terminals 46 and 47 of the IC 43 and the delayed luminance signal is applied from the output of delay line 42 to terminals 44, 45, of IC 43. In this embodiment, a commercially available multiplier IC, such as integrated circuit MC 1495L, manufactured by Motorola Corporation, may be used as the IC 43. The circuit equivalent of integrated circuit MC 1495L is shown in FIG. 8, and a detailed description thereof is omitted. In such an integrated circuit, whenever signals represented by symbols A, B, C and D are applied to input terminals 44, 45, 46 and 47, respectively, the current $I_L$ through a load resistor connected with terminal 48 of multiplier IC 43 is according to the following equation:

$$I_L = \tfrac{1}{2}I_0 + 2K_1K_2(A-C)(B-D) \tag{4}$$

Accordingly, when the same signal is applied to both input terminals 44 and 45, that is, A=B, and the same input signal is applied to both input terminals 46 and 47, that is, C=D, the current $I_L$ is expressed as follows:

$$I_L = \tfrac{1}{2}I_0 + 2K_1K_2(A-C)^2 \tag{5}$$

Thus, since the luminance signal $S_Y$ is applied as signal C to terminals 46, 47 and the delayed luminance signal is applied as signal A to terminals 44, 45, each of output terminals 48 and 49 of integrated circuit 43 provides a signal proportional to the square of the difference between the undelayed luminance signal and the delayed luminance signal. Thus, output terminals 48 and 49 correspond to outputs 36c and 36c' on FIG. 6 and similarly provide vertical aperture correction signals of opposite polarities.

Therefore, in the embodiment of FIG. 8, multiplier IC 43 functions both as a subtracting circuit and as a squaring circuit. The IC output terminals 48 and 49 provide their respective output signals to fixed contacts of a switch 50 which has its movable contact connected through a variable resistor 51 with one input of a combining or mixing circuit 52. Other inputs of circuit 52 are respectively connected with input terminal 41 to receive the incoming luminance signal and with the output of delay line 42 to receive the delayed luminance signal. Switch 50 selectively connects one or the other of the output terminals 48 and 49 to combining circuit 52. Combining circuit 52 combines the incoming video signal $S_Y$, the delayed video signal from delay line 42, and the vertical aperture correction signal derived from output 48 or 49 of the multiplier IC 43 to produce the signal illustrated in FIG. 7F or 7G and corresponding to waveform F(t) of equation (3). Variable resistor 51 between switch 50 and combining circuit 52 provides adjustment of the extent of vertical aperture correction. Thus, a vertical aperture corrected luminance signal equivalent to that obtained at output terminal 39 on FIG. 6 is obtained from the output terminal 53 of combining circuit 52.

Figure 9:
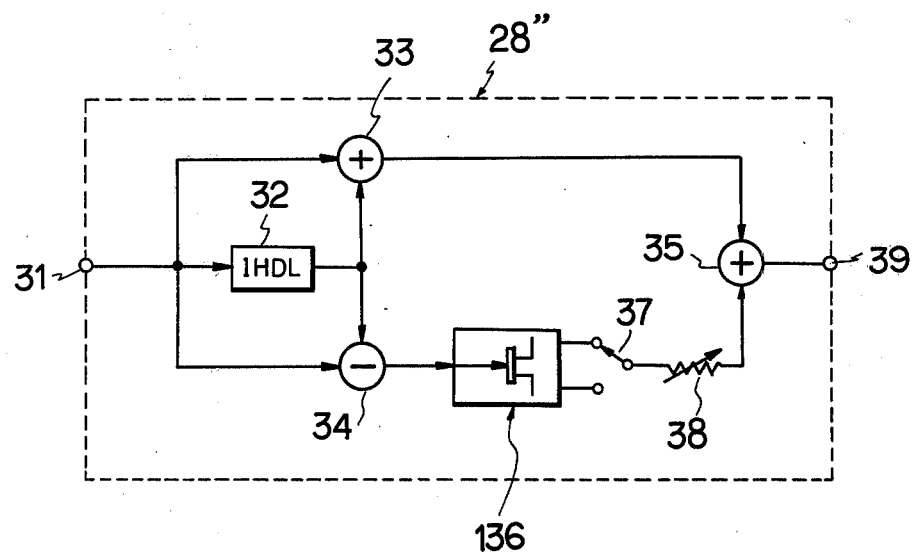
FIG. 9 is a view similar to that of FIG. 6, but in which a square-law FET is employed as the squaring circuit.

In still another embodiment of the invention illustrated on FIG. 9, the signal processing circuit 28" is seen to be similar to the circuit 28 of FIG. 6, but employs a square-law characteristic FET 136. The remaining elements of circuit 28" correspond to previously described elements of circuit 28 and are identified by the same reference numerals. In circuit 28", the output of subtracting circuit 34 is applied to an input of square-law characteristic FET 136. The output of FET 136 is then supplied through variable resistor 38 as a squared signal to second adding circuit 35. The output 39 then provides a vertical aperture corrected luminance signal free from any line-crawling component.

Although several embodiments of the invention have been described in detail herein with reference to the accompanying drawings, it is to be understood that the invention is not limited to those precise embodiments, and that various changes and modifications may be effected therein by one skilled in the art without departing from the scope or spirit of the present invention as defined in the appended claims.

What is claimed is:

1. A video signal processing circuit comprising input circuit means to which an input video signal is supplied, delay circuit means for delaying said input video signal from said input circuit means by one horizontal scanning interval and providing a delayed video signal, signal squaring means for squaring the difference in level between said input video signal and said delayed video signal, and signal mixing means for mixing at least said input video signal with the squared signal from said signal squaring means and thereby providing a corrected output signal.

2. A video signal processing circuit according to claim 1; further comprising means for applying said delayed video signal to said signal mixing means.

3. A video signal processing circuit according to claim 2; in which said means for applying said delayed video signal to said signal mixing means includes an adding circuit for adding said delayed video signal to said input video signal and providing an additively combined signal applied to said signal mixing means.

4. A video signal processing circuit according to claim 1; wherein said squaring means is a semiconductor device having a square-law characteristic.

5. A video signal processing circuit according to claim 1; wherein said squaring means includes a multiplier circuit having two input terminals to each of which said difference between said input video signal and said delayed video signal is supplied.

6. A video signal processing circuit according to claim 1; wherein said squaring means includes multiplier circuit means having four input terminals, said input video signal is supplied to two of said four input terminals and said delayed video signal is supplied to the others of said four input terminals; and said multiplier circuit means is operative to square the difference in level between the input video signal and the delayed video signal.

7. A video signal processing circuit according to claim 6; further comprising means for applying said delayed video signal to said signal mixing means.

8. A video signal processing circuit according to claim 1; wherein said squaring means has two output terminals for providing respective output signals of opposite polarity, and further comprising a switch for selectively supplying one of said two output signals to said mixing means.

9. A video processing circuit according to claim 1; further comprising means for adjusting the amplitude of said squared signal.

10. A video processing circuit according to claim 9; wherein said means for adjusting includes a variable resistance connected between said squaring means and said mixing means.

11. In a color image pickup device having an image pickup tube including a photo-electric conversion layer, means for forming on said layer a color-separated image of an object being televised, means for applying an alternating potential pattern to said layer, means for deriving from said photo-electric conversion layer a composite signal which includes a chrominance signal, an index signal due to said alternating potential pattern and having a frequency equal to the carrier frequency of said chrominance signal and a luminance signal which undergoes level changes in successive horizontal intervals due to said alternating potential pattern, and means for separating said chrominance, index and luminance signals; a vertical aperture correction circuit for eliminating said level changes from the separated luminance signal comprising delay circuit means for providing a delayed luminance signal delayed by one horizontal interval in respect to said separated luminance signal, signal squaring means for squaring the difference in level between said separated luminance signal and said delayed luminance signal, and signal mixing means for mixing at least said separated luminance signal with the squared signal from said signal squaring means and thereby providing a vertical aperture corrected luminance signal.

12. A color image pickup device according to claim 11; in which said signal mixing means includes a first adding circuit for adding said delayed luminance signal to said separated luminance signal, and a second adding circuit for adding said squared signal to the output of said first adding circuit.

13. A color image pickup device according to claim 11; in which said squaring means is an FET device having a square-law characteristic.

14. A color image pickup device according to claim 11; in which said squaring means includes a multiplier circuit for multiplying by itself said difference in level between said separated luminance signal and said delayed luminance signal.

15. A color image pickup device according to claim 11; in which said squaring means has first and second outputs for providing said squared signal with opposite polarities, respectively; and further comprising switch means for selectively cnnecting one of said first and second outputs of the squaring means to said mixing means.

16. A color image pickup device according to claim 11; further comprising means for adjusting the level of said squared signal as applied to said mixing means.

* * * * *